United States Patent [19]

Dauberger

[11] 4,071,213
[45] Jan. 31, 1978

[54] CLAMP BACK SPACER FOR CONDUIT
[75] Inventor: George R. Dauberger, Pittsburgh, Pa.
[73] Assignee: Midland-Ross Corporation, Cleveland, Ohio
[21] Appl. No.: 726,773
[22] Filed: Sept. 27, 1976
[51] Int. Cl.² .............................................. F16L 3/10
[52] U.S. Cl. .................................................. 248/74 R
[58] Field of Search .................. 248/74 R, 70, 71, 73, 248/68 CB, 67.5, 68 R, 49, 62

[56] References Cited
U.S. PATENT DOCUMENTS

| 631,234 | 8/1899 | Stevens | 248/74 R |
| 1,063,566 | 6/1913 | McFeaters | 248/74 R X |
| 1,776,343 | 9/1930 | Allyn | 248/74 R |
| 3,232,569 | 2/1966 | Deardorf | 248/74 R |
| 3,498,575 | 3/1970 | Downing | 248/74 R |
| 3,559,933 | 2/1971 | Castellani | 248/74 R |
| 3,604,676 | 9/1971 | Weber | 248/68 R |
| 3,951,368 | 4/1976 | Appleton | 248/74 R |

FOREIGN PATENT DOCUMENTS

| 544,618 | 4/1942 | United Kingdom | 248/68 CB |
| 1,213,185 | 11/1970 | United Kingdom | 248/68 R |
| 749,510 | 5/1956 | United Kingdom | 248/68 CB |
| 652,676 | 5/1951 | United Kingdom | 248/62 |

Primary Examiner—Roy D. Frazier
Assistant Examiner—Rodney H. Bonck
Attorney, Agent, or Firm—H. Duane Switzer

[57] ABSTRACT

A clamp back spacer for rigid conduit or the like includes a generally flat base member having opposite upper and lower surfaces. Projection means extends outwardly from the upper surface to define a cradle for cradling the rigid conduit. Recess means in the lower surface of the base member is dimensioned for receiving the projection means on another base member. The projection means and recess means are located for reception of the projection means on one base member in the recess means of another base member when a pair of base members are reversely positioned end-for-end relative to one another in stacked relationship. The projection means and recess means are shaped for preventing relative sliding movement in all directions between a pair of stacked base members.

7 Claims, 5 Drawing Figures

CLAMP BACK SPACER FOR CONDUIT

BACKGROUND OF THE INVENTION

This application relates to the art of spacers and, more particularly, to spacers for spacing rigid conduit or the like from a surface to which the conduit is secured.

Known clamp back spacers for conduit include the type disclosed in U.S. Pat. No. 3,559,933 issued Feb. 2, 1971, to Castellani. In the Castellani spacer, there is a relatively large opening and slot for receiving a screw which secures the spacer to a surface. This would allow the spacer to move longitudinally in one direction relative to the screw so it is necessary to firmly hold the spacer in its desired position while the mounting screw is tightened. Two or more stacked Castellani spacers can shift transversely relative to one another because they are not locked together against movement and special care must be used to be sure the spacers do not rotate or shift transversely relative to one another during mounting.

SUMMARY OF THE INVENTION

A clamp back spacer for rigid conduit or the like includes a generally flat base member having opposite upper and lower surfaces. Projection means extends outwardly from the upper surface to define a cradle for cradling rigid conduit or the like and spacing same outwardly from a surface to which the spacer is secured. The lower surface of the spacer includes recess means for receiving the projection means on another base member when a pair of base members are stacked on top of one another. The projection means and recess means are shaped for preventing relative sliding movement in all directions between a pair of stacked base members.

In one arrangement, the base member has opposite ends and opposite sides, and the projection means and recess means are spaced inwardly from the ends and sides.

In the preferred arrangement, the base member has a transverse centerline extending across its sides centrally between its ends. The projection means and recess means are located on opposite sides of the transverse centerline so that a pair of base members are stackable by reversely positioning such members end-for-end relative to one another.

The base member has a longitudinal centerline extending across its ends and a fastener receiving hole extends through the base member at the intersection of the transverse and longitudinal centerlines. Elongated slots are formed through the base member along the longitudinal centerline on opposite sides of the fastener receiving hole. Screws are extendable through the slots for holding a clamp against conduit positioned in the projection means.

The lower surface of the base member is stepped upwardly toward its upper surface inwardly from the outer periphery thereof to define a cavity extending over a major portion of the length and width of the base member. This saves on material while providing firm support around the entire periphery of the base member.

It is a principal object of the present invention to provide an improved clamp back spacer for mounting rigid conduit or the like in outwardly-spaced relationship to a mounting surface on which the spacer is mounted.

It is a further object of the invention to provide a clamp back spacer which can be stacked with other spacers and is firmly locked against relative movement in all directions when so stacked.

It is a further object of the invention to provide a clamp back spacer which is stackable with like spacers by reversely positioning the spacers end-for-end.

It is also an object of the invention to provide a clamp back spacer which is economical to manufacture by using a minimum of material while maintaining high strength.

DESCRIPTION OF A PREFERRED EMBODIMENT

Figure 1:
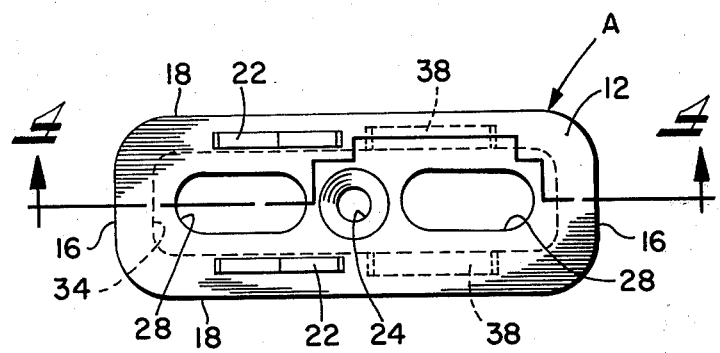
FIG. 1 is a top plan view of the clamp back spacer of the present application.

With reference to the drawing, a clamp back spacer for rigid conduit or the like comprises a generally flat rectangular base member A having upper and lower surfaces 12 and 14, and an outer periphery defined by opposite ends 16 intersecting opposite sides 18 at smoothly curved corners.

Figure 2:
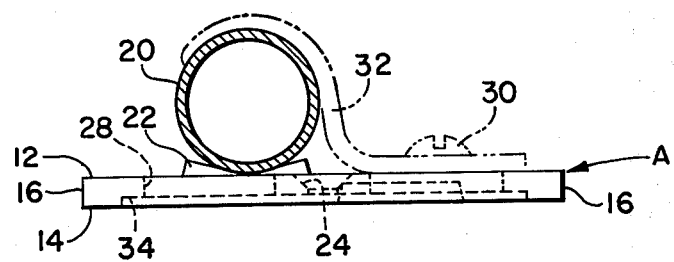
FIG. 2 is a side elevational view thereof, and additionally showing a conduit and clamp.

Projection means extends outwardly from upper surface 12 to define a cradle for cradling rigid conduit or the like as shown at 20 in FIG. 2. In one arrangement, the projection means takes the form of a pair of generally V-shaped projections 22 spaced inwardly from opposite sides 18. A central countersunk hole 24 through base member A is provided for receiving a screw to secure base member A against a mounting surface such as a wall or the like. Elongated longitudinal slots 28 are formed through base member A for passage of a screw as shown at 30 in FIG. 2 which secures a clamp strap or the like 32 in position against conduit 20 for holding same against projections 22.

Figure 3:
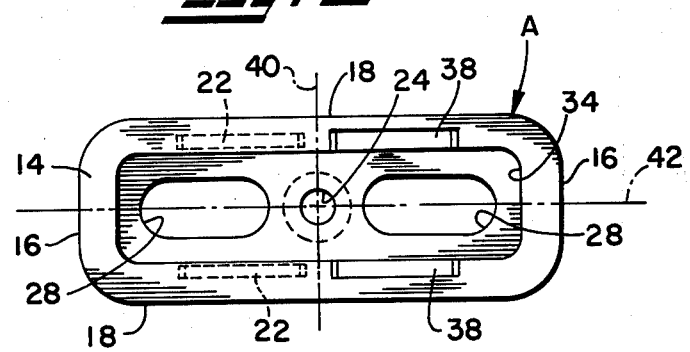
FIG. 3 is a bottom plan view thereof.

Lower surface 14 is upwardly recessed as shown at 34 at a location spaced inwardly from the outer periphery of base member A to define a cavity. Between cavity 34 and opposite sides 18, base member A is provided with recesses 38 shaped and dimensioned for receiving projections 22. For reference purposes, a transverse centerline 40 is shown in FIG. 3 extending across opposite sides 18 centrally between opposite ends 16. A longitudinal centerline 42 extends across opposite ends 16 centrally between opposite sides 18. The center of hole 24 for receiving a mounting fastener coincides with the intersection of transverse and longitudinal centerlines 40 and 42. Elongated slots 28 extend along longitudinal centerline 42. Projections 22 and recesses 38 are located equidistantly on opposite sides of transverse centerline 40. Projections 22 are located intermediate cavity 34 and opposite sides 18 so that a rigid conduit cradled therein has firm support through the entire thickness of base member A from upper surface 12 to lower surface 14.

Figures 4, 5:
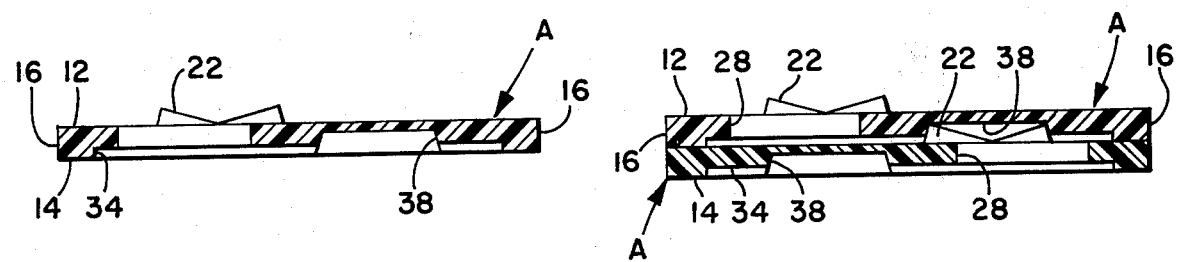
FIG. 4 is a cross-sectional elevational view taken generally on line 4—4 of FIG. 1.
FIG. 5 is a view similar to FIG. 4 showing a pair of spacers stacked on top of one another.

As shown in FIG. 5, a pair of base members A are reversely positioned end-for-end relative to one another and stacked with projections 22 of one received in recesses 38 of the other. This firmly locks the two spacers together against transverse movement relative to one another in all directions. This facilitates mounting of stacked spacers because it is not necessary to carefully hold them while a fastener is driven home through fastener receiving opening 24. Providing cavity or recess 34 along substantially the full length and width of base member A minimizes the cost of the spacer by saving on material while maintaining a very high strength in the spacer.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A clamp back spacer for rigid conduit or the like comprising; a generally flat base member having opposite upper and lower surfaces, projection means extending outwardly from said upper surface to define a cradle for cradling rigid conduit or the like, recess means in said lower surface for receiving said projection means on another identical base member when an identical pair of such base members are stacked on top of one another, said base member having opposite ends and opposite sides and a transverse centerline extending across said sides centrally between said ends, said projection means and said recess means being located on opposite sides of said transverse centerline so that a pair of identical base members are stackable by reversely positioning such members end-for-end relative to one another, and said projection means and recess means being shaped for preventing relative sliding movement in all directions between a stacked identical pair of said base members.

2. The spacer of claim 1 wherein said base member has a longitudinal centerline extending across said ends centrally between said sides, a fastener receiving hole through said base member at the intersection of said centerlines, and elongated slots through said base member along said longitudinal centerline on opposite sides of said hole.

3. The spacer of claim 2 wherein said projection means comprises a generally V-shaped projection on opposite sides of one of said slots, each said projection being spaced inwardly from said sides.

4. A clamp back spacer for rigid conduit or the like comprising; a generally flat base member having opposite upper and lower surfaces, projection means extending outwardly from said upper surface to define a cradle for cradling rigid conduit or the like, recess means in said lower surface for receiving a projection means on another identical base member, said projection means and recess means being located for reception of the projection means on one base member in the recess means of another identical base member when an identical pair of such base members are reversely positioned end-for-end relative to one another in stacked relationship.

5. The spacer of claim 4 wherein said base member has opposite ends and opposite sides and a transverse centerline extending across said sides centrally between said ends, and said projection means being located on one side of said transverse centerline and said recess means being located on the other side of said transverse centerline.

6. The spacer of claim 5 wherein said base member has a longitudinal centerline extending across said ends centrally between said sides, a fastener receiving hole through said base member at the intersection of said transverse and longitudinal centerlines, and elongated slots through said base member on opposite sides of said hole.

7. The spacer of claim 5 wherein said projection means comprises a pair of spaced-apart generally V-shaped projections spaced inwardly from said sides.

* * * * *